(12) United States Patent
Chang et al.

(10) Patent No.: US 11,792,078 B2
(45) Date of Patent: Oct. 17, 2023

(54) MULTI-ACCESS EDGE COMPUTING CLOUD DISCOVERY AND COMMUNICATIONS

(71) Applicant: Verizon Patent and Licensing Inc., Arlington, VA (US)

(72) Inventors: Patricia R. Chang, San Ramon, CA (US); Arda Aksu, Lafayette, CA (US); Lalit R. Kotecha, San Ramon, CA (US); Sagiv Draznin, Walnut Creek, CA (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 704 days.

(21) Appl. No.: 16/523,572

(22) Filed: Jul. 26, 2019

(65) Prior Publication Data
US 2021/0028992 A1    Jan. 28, 2021

(51) Int. Cl.
*H04L 41/12* (2022.01)
*H04L 67/10* (2022.01)
*H04L 9/40* (2022.01)

(52) U.S. Cl.
CPC .............. *H04L 41/12* (2013.01); *H04L 67/10* (2013.01); *H04L 63/08* (2013.01)

(58) Field of Classification Search
CPC . H04L 41/12; H04L 41/2067; H04L 41/0836; H04L 41/0886; H04L 67/12; H04L 67/322; H04L 67/1021; H04L 67/1008; H04L 63/08
See application file for complete search history.

(56) References Cited

U.S. PATENT DOCUMENTS

| | | | |
|---|---|---|---|
| 2012/0005685 A1* | 1/2012 | Chen | G06F 9/5072 718/104 |
| 2012/0324445 A1* | 12/2012 | Dow | G06F 9/45504 718/1 |
| 2018/0150240 A1* | 5/2018 | Bernat | G06F 21/44 |
| 2019/0140919 A1* | 5/2019 | Smith | H04L 9/50 |
| 2019/0141593 A1* | 5/2019 | Wei | H04W 36/00837 |
| 2019/0158300 A1* | 5/2019 | Sabella | H04M 15/8353 |
| 2020/0007414 A1* | 1/2020 | Smith | G06Q 30/08 |

* cited by examiner

*Primary Examiner* — Farzana B Huq

(57) ABSTRACT

A network device may instantiate a first process in a first Multi-Access Edge Computing (MEC) cluster within a first MEC network; register the first MEC network at a MEC cloud; receive a call from the first process to obtain information from a second process in a second MEC cluster within a second MEC network that is registered at the MEC cloud; create a first message based on the call; send the first message from the first MEC cluster to the second MEC cluster; receive, at the first MEC cluster, a second message from the second MEC cluster, wherein the second message is provided by the second MEC cluster in response to receiving the first message; and extract a return value from the second message, wherein the return value is generated by the second process in response to receipt of the call in the second MEC cluster.

20 Claims, 12 Drawing Sheets

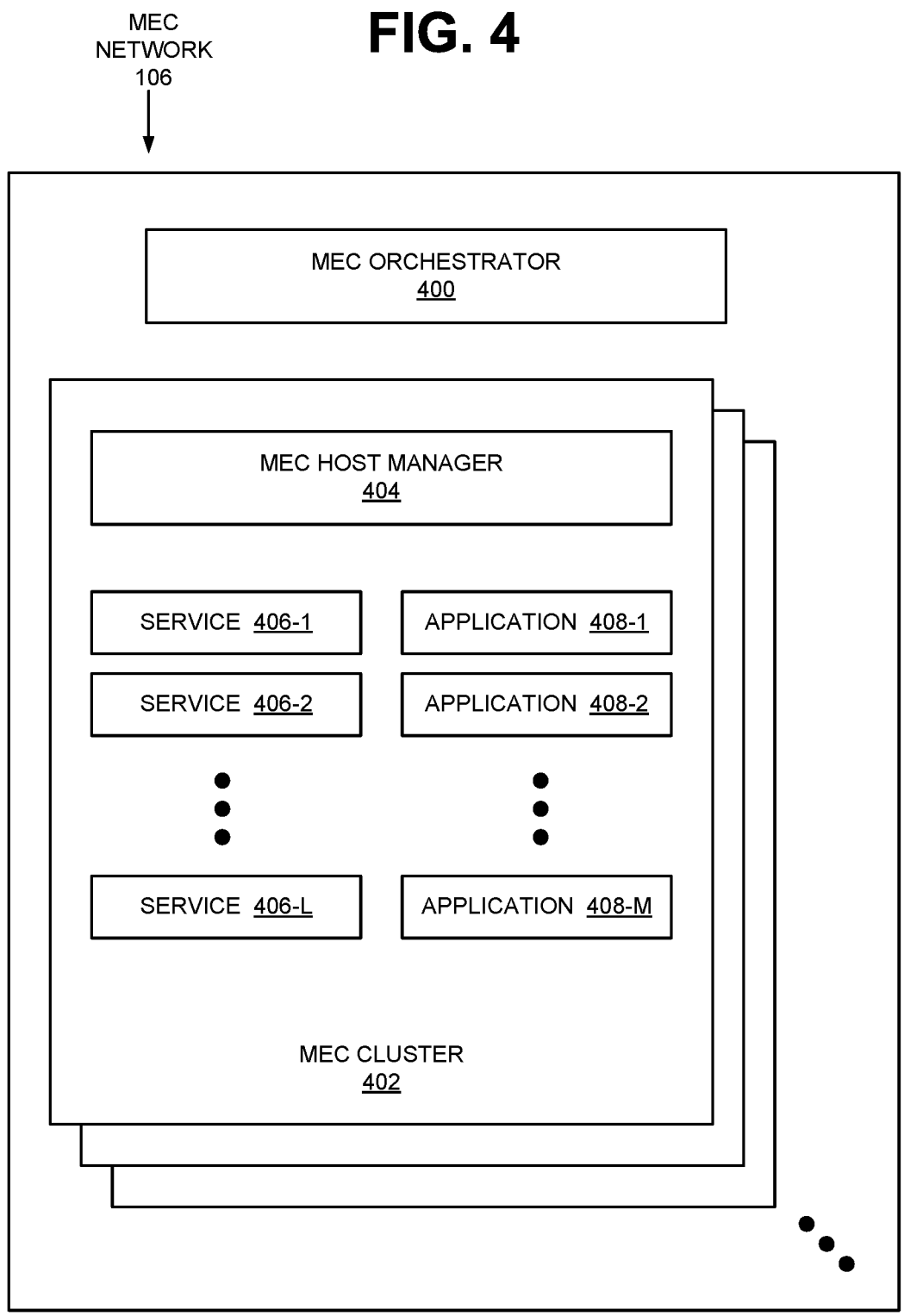

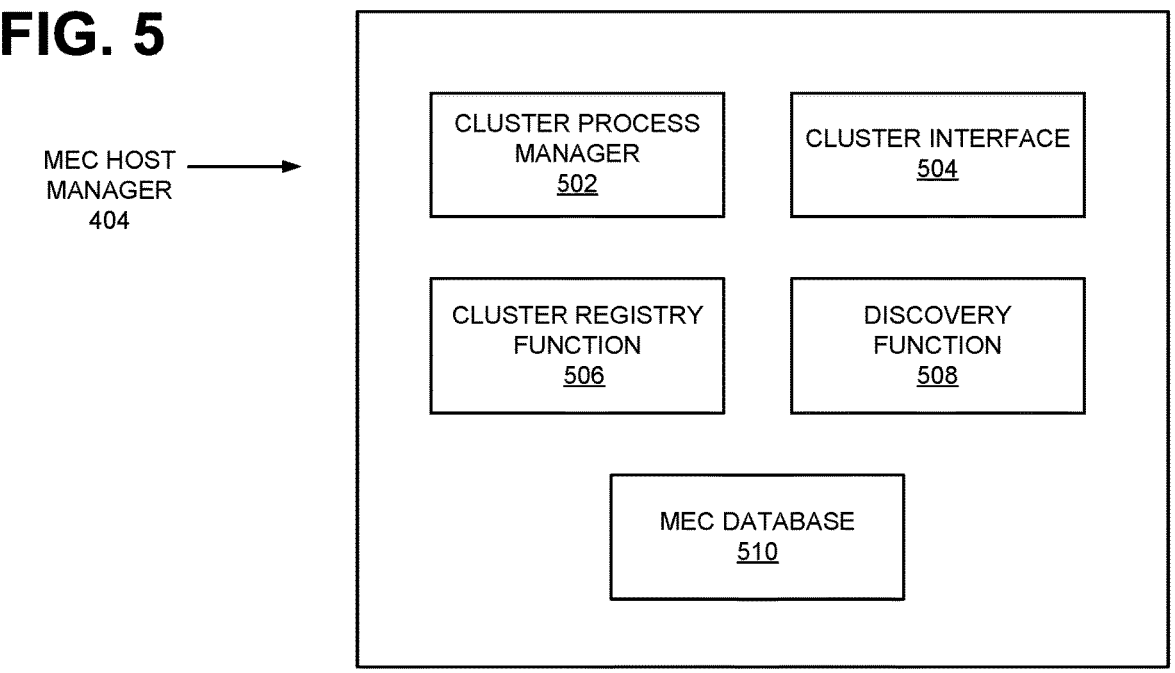
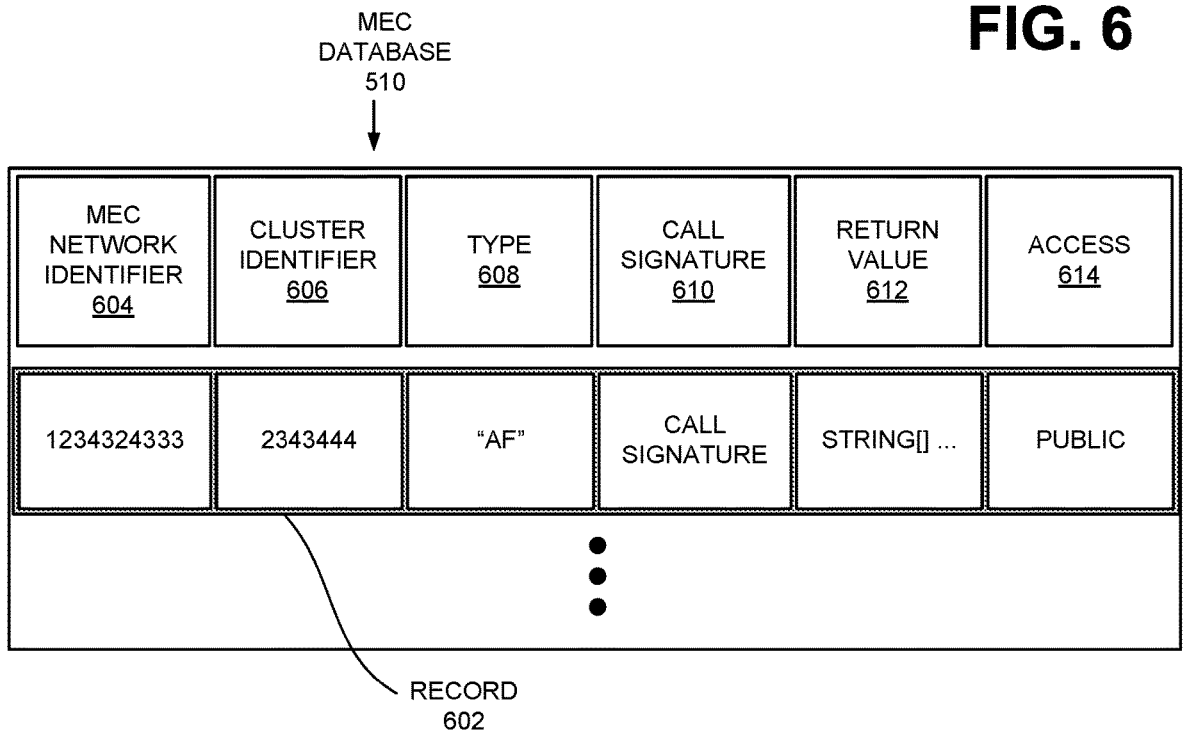

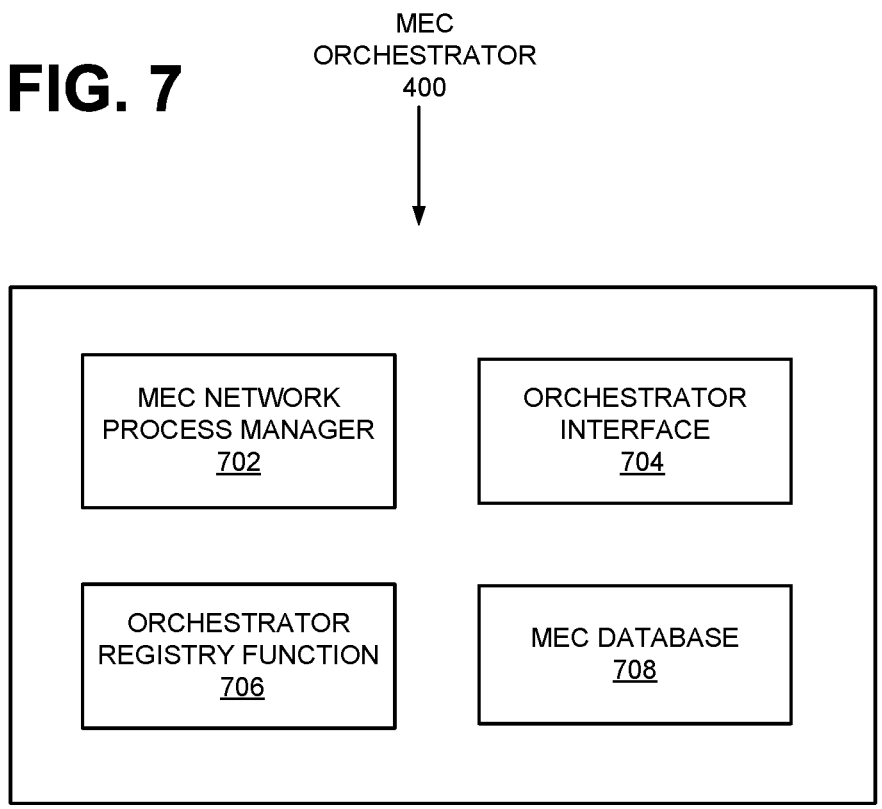

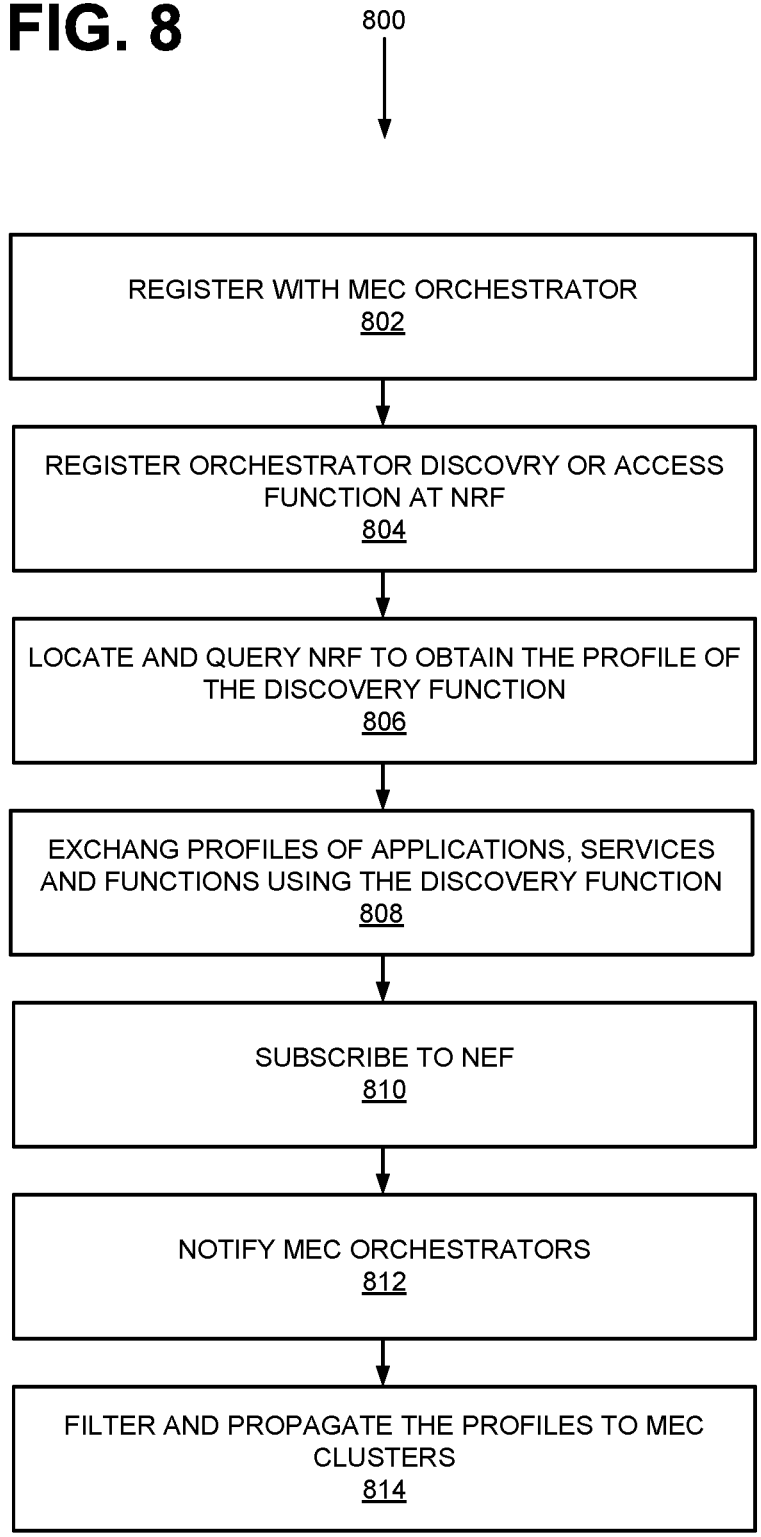

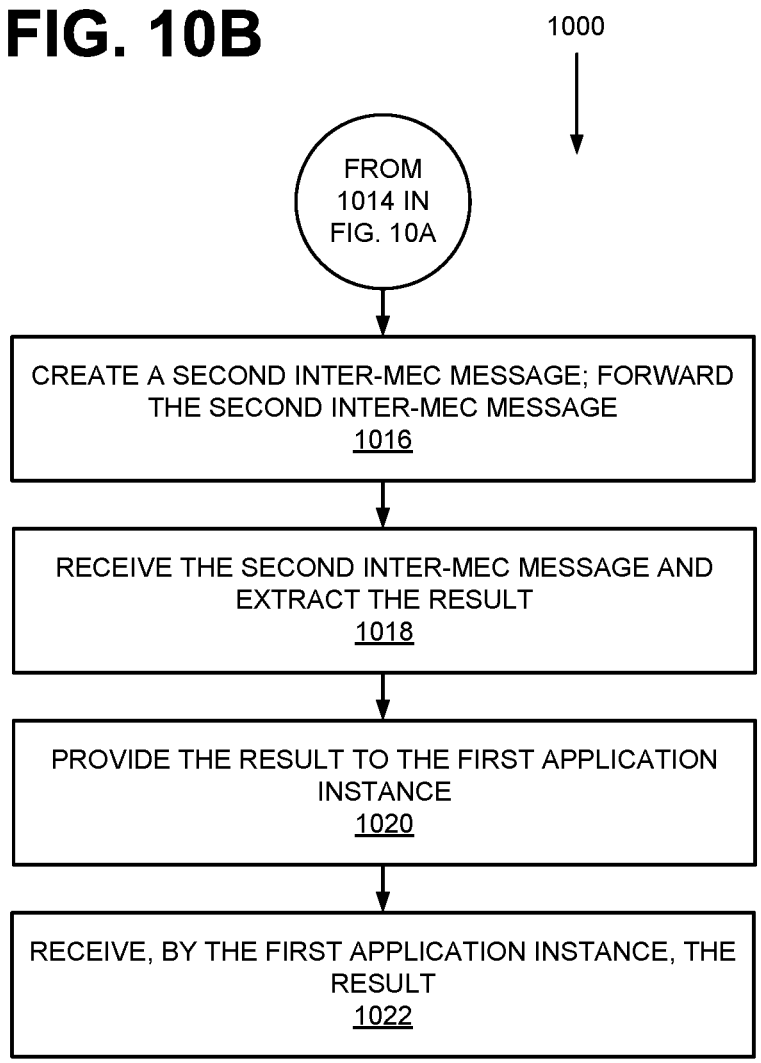

MULTI-ACCESS EDGE COMPUTING CLOUD DISCOVERY AND COMMUNICATIONS

BACKGROUND INFORMATION

In order to satisfy the needs and demands of users of mobile communication devices, providers of wireless communication services continue to improve available services. One enhancement made possible through new broadband cellular networks is the use of Multi-access Edge Computing (MEC) clusters (also referred to as Mobile Edge Computing clusters). The MEC clusters allow high network computing loads to be transferred onto edge servers. Depending on the location of the edge servers relative to the point of attachment (e.g., a wireless station for a user device), MEC clusters can provide various services and applications to user devices with minimal latency.

BRIEF DESCRIPTION OF THE DRAWINGS

FIG. 4 shows a Multi-Access Edge Computing (MEC) orchestrator and exemplary functional components of a MEC network of FIGS. 1A, 1B, and 3;

FIG. 5 depicts exemplary functional components of the MEC host manager of FIG. 4;

FIG. 6 illustrates exemplary components of MEC database of FIG. 5;

FIG. 7 depicts exemplary functional components of the MEC orchestrator of FIG. 4;

FIG. 8 is a flow diagram of an exemplary process associated with a MEC network registering with a MEC cloud;

FIGS. 10A and 10B show a flow diagram of an exemplary process that is associated with sharing state information between MEC networks that are part of the same MEC cloud.

DETAILED DESCRIPTION OF PREFERRED EMBODIMENTS

The following detailed description refers to the accompanying drawings. The same reference numbers in different drawings may identify the same or similar elements.

A Multi-access Edge Computing or Mobile Edge Computing (MEC) cloud is a collection of interconnected MEC networks. A service provider may implement a MEC network to provide faster services with less latency, enhanced processing, and more efficient resource usage, etc., to user equipment (UE). Each MEC network may include multiple MEC clusters, and each MEC cluster may be located so that the cluster is geographically close to the UE devices that the cluster services. The close proximity of the MEC cluster may reduce the average latency of the services rendered by the MEC cluster.

To ensure that MEC clusters render services with minimal latency, MEC clusters are capable of handling heavy computational loads at high speeds based on local information. To allow the MEC networks to support UE device mobility or to provide services that depend on non-local information, MEC networks and clusters need a mechanism to efficiently share information. For example, assume that MEC networks form a MEC cloud. The MEC networks may need to share information in at least two situations: (1) when servicing a UE device involves another UE device serviced by another MEC network; and (2) when a UE device in a location that is serviced by the MEC network moves to another location serviced by the other MEC network. In the first situation, an instance of an application at the MEC network may need to access information held by another instance of the application at another MEC network. In the second situation, if the application instance has state information associated with the UE device, the application instance may need to transfer the state information to the application instance at the other MEC network when the UE device moves from the current location to the other location. In both of these example situations, the MEC cloud must enable the application instances to share state information with minimal latency.

As described herein, systems and methods may support information sharing between different MEC networks that belong to the same MEC cloud. To enable such sharing, a MEC network may register and authenticate with the MEC cloud, advertising its presence to other MEC networks. Once the MEC network has joined the cloud, a MEC cluster in the MEC network may discover neighboring or adjacent MEC clusters in other MEC networks; and exchange information with the other MEC clusters over backhaul links or over core networks.

Figure 1A:
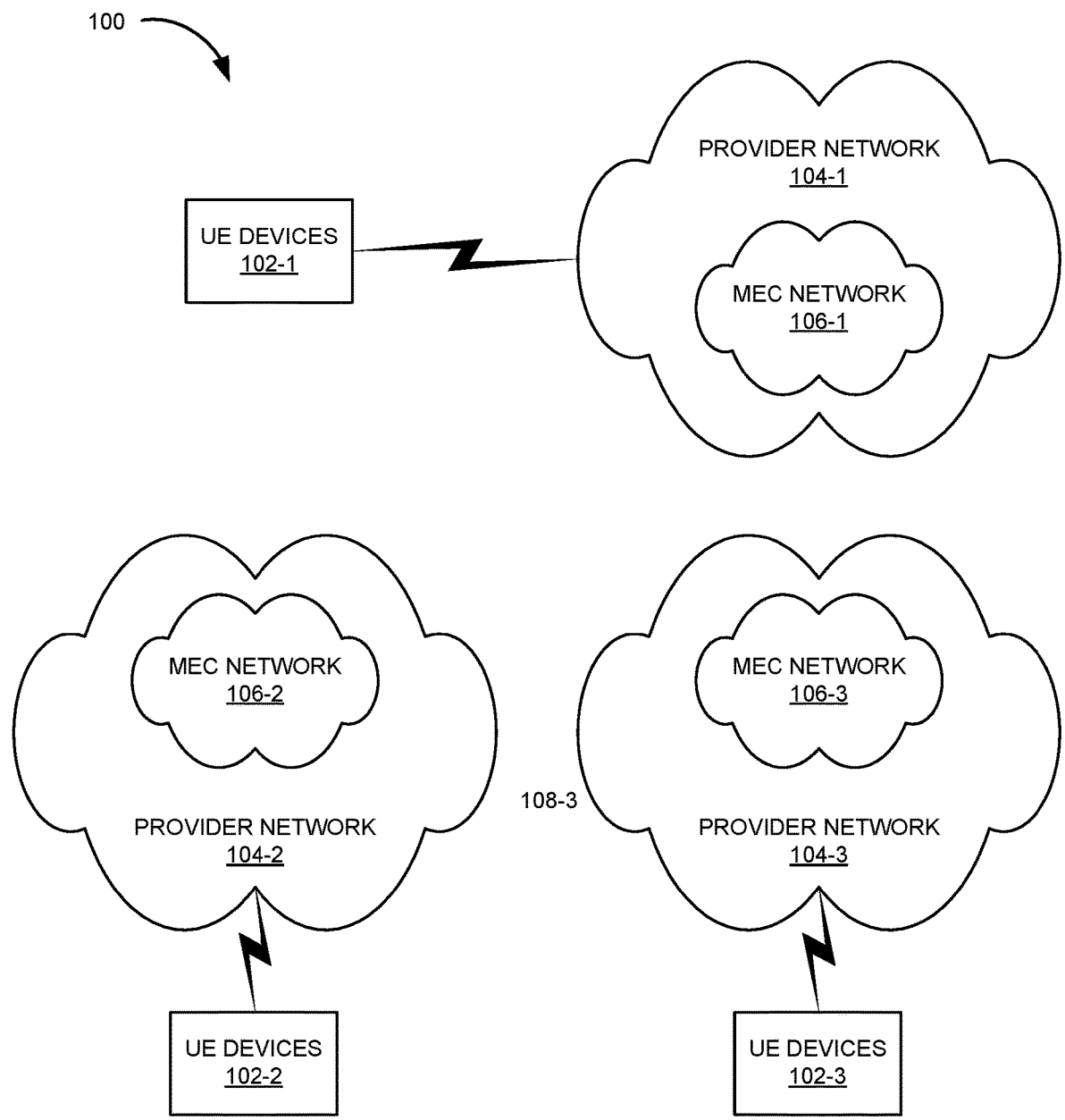
FIGS. 1A and 1B illustrate an exemplary network environment in which the concepts described herein may be implemented.
Figure 1B:
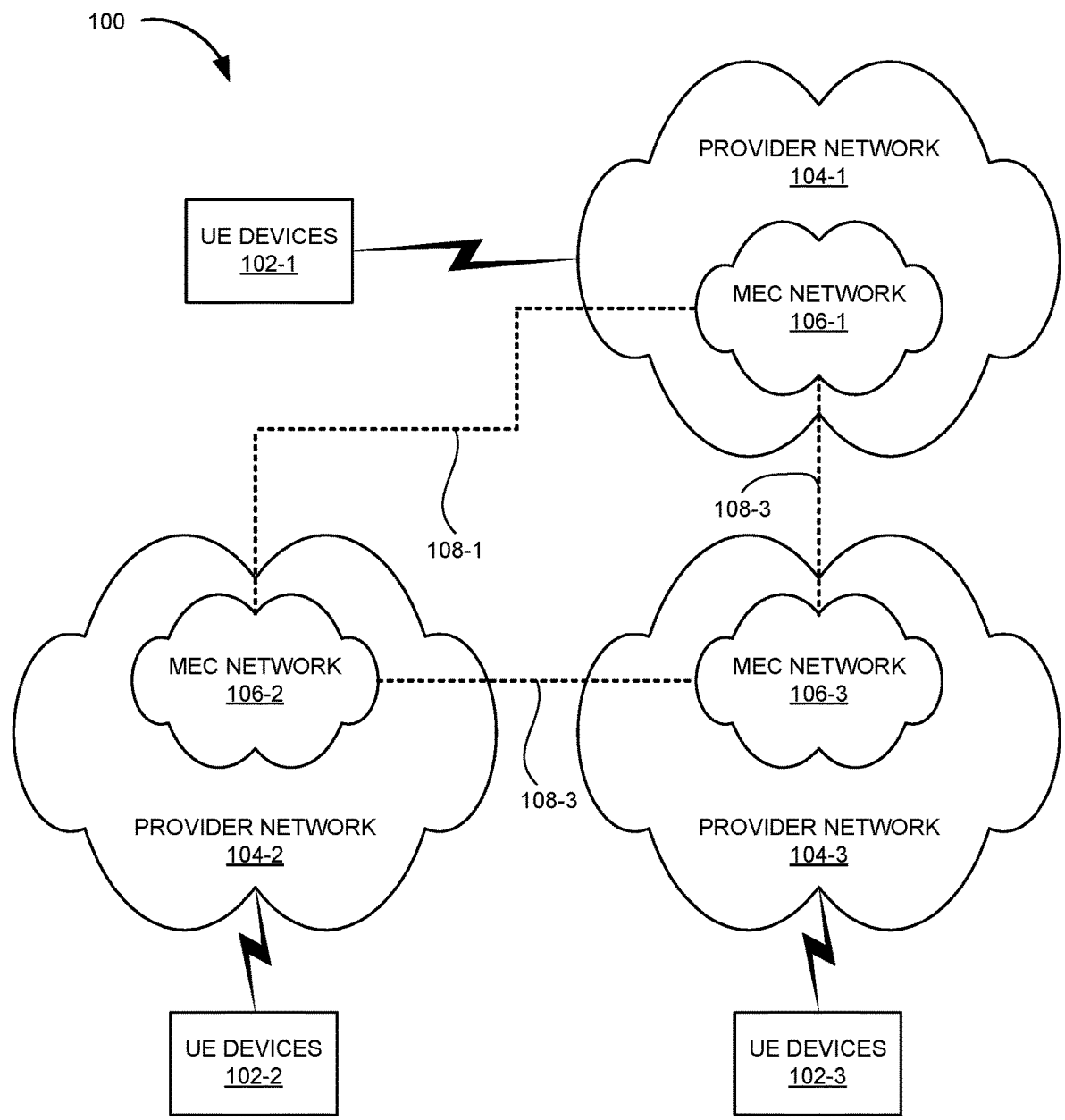

FIGS. 1A and 1B illustrate an exemplary network environment 100 in which the concepts described herein may be implemented. As shown in FIG. 1A, environment 100 may include UE devices 102-1 through 102-3 (referred to as "UE devices 102" or "UE device 102") and provider networks 104-1 through 104-3 (collectively referred to as "provider networks 104" or "provider network 104"). For simplicity, FIG. 1A does not show all components that may be included in network environment 100 (e.g., routers, bridges, wireless access point(s), additional networks, additional UE devices, etc.). That is, depending on the implementation, network environment 100 may include additional, fewer, different, or a different arrangement of components than those illustrated in FIG. 1A.

UE device 102 may include a wireless communication device. Examples of a UE device 102 include: a smart phone; a tablet device; a wearable computer device (e.g., a smart watch); a global positioning system (GPS) device; a laptop computer; a media playing device; a portable gaming system; and an Internet-of-Things (IoT) device. In some implementations, UE device 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE device 102 may send packets over or to provider network 104.

Provider network 104 may provide communication-related services (e.g., Internet Protocol (IP) services) to UE devices 102. Provider network 104 may include a local area network (LAN), a wide area network (WAN), a metropolitan area network (MAN), a radio access network, an optical network, a cable television network, a satellite network, a wireless network (e.g., a CDMA network, a general packet radio service (GPRS) network, an Long Term Evolution (LTE) network (e.g., a Fourth Generation (4G) network), a Fifth Generation (5G) network, an ad hoc network, a telephone network (e.g., the Public Switched Telephone Network (PSTN), an intranet, or a combination of networks. Provider network 104 may interface with other external networks, such as a packet data network or another provider network 104.

Referring back to FIG. 1A, each of provider networks 104-1 through 104-3 may include a corresponding MEC network 106-1 through 106-3. MEC network 106 allows high network computational loads to be transferred onto edge servers within MEC clusters that the MEC network 106 comprises. Depending on the location of the edge servers relative to the point of attachment (e.g., a wireless station for a UE device), MEC network 106 can provide various services and applications to UE devices 102 with minimal latency.

In FIG. 1A, because MEC network 106-1 belongs to provider network 104-1, information about UE devices 102-1 serviced by MEC network 106-1 may be unavailable to MEC networks 106-2 and 106-3. However, there are situations in which sharing information between different MEC networks 106 may enable MEC networks 106 to provide improved services to UE devices 102. For example, in one scenario, assume that UE devices 102-1 and 102-2 are close to one another. If UE devices 102-1 and 102-2 are implemented as autonomous vehicles whose traffic routes are coordinated via applications on MEC networks 106-1 and 106-2, location information of UE devices 102-1, which MEC network 106-1 has, may be useful to MEC network 106-2 to map UE device 102-2 routes. In another example, when a UE device 102-1 moves from a first location that is serviced by MEC network 106-1 to another location serviced by MEC network 106-2 and MEC network 106-1 has state information associated with UE device 102-1, MEC network 106-2 may be able to provide the continuity of application service when it receive the state information from MEC network 106-1.

FIG. 1B re-illustrates network environment 100 of FIG. 1A, with MEC networks 106-1 through 106-3 connected through backhaul communication links 108-1 through 108-3. In FIG. 1B, MEC networks 106-1 through 106-3 form a MEC cloud, which enables information sharing between MEC networks 106-1 through 106-3. In FIG. 1B, each of MEC networks 106 may register and authenticate with the MEC cloud, advertising its MEC clusters to other MEC networks 106. Once the MEC networks 106 have joined the cloud, MEC clusters in MEC networks 106 may discover neighboring or adjacent MEC clusters; and exchange information with the other MEC clusters through backhaul communication links 108 or through core networks over a control plane. Backhaul links 108 may be wired, wireless or optical links and may be direct or indirect.

Figure 2:
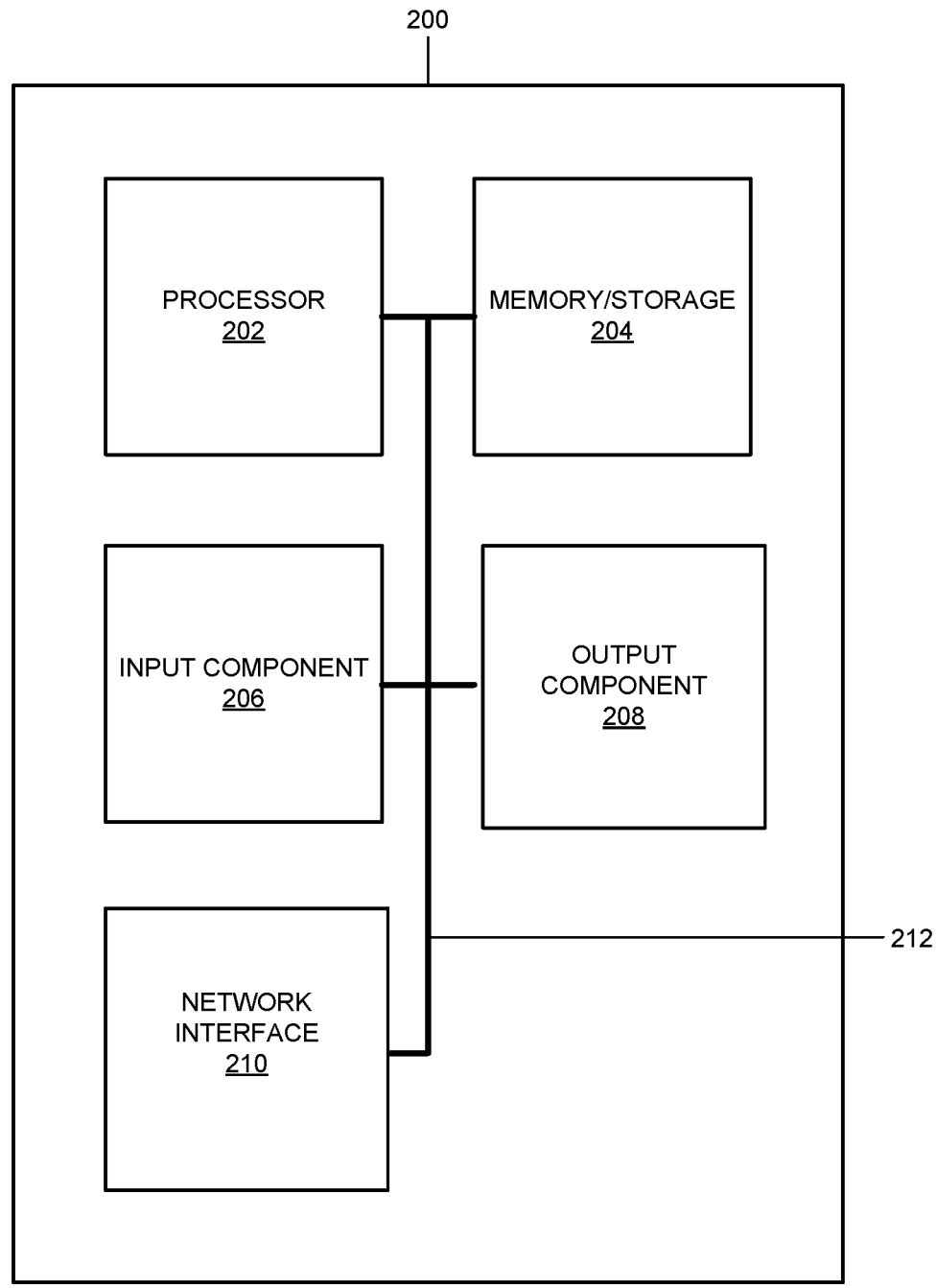
FIG. 2 depicts exemplary components of an exemplary network device.

FIG. 2 depicts exemplary components of an exemplary network device 200. Network device 200 may correspond to or may be included in any of network components of FIG. 1A and FIG. 1B (e.g., UE device 102, a router, a network switch, servers, gateways, devices in MEC clusters 106, etc.). As shown, network device 200 may include a processor 202, memory/storage 204, input component 206, output component 208, network interface 210, and communication path 212. In different implementations, network device 200 may include additional, fewer, different, or a different arrangement of components than the ones illustrated in FIG. 2. For example, network device 200 may include a display, network card, etc.

Processor 202 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 200 and/or executing programs/instructions.

Memory/storage 204 may include static memory, such as read only memory (ROM), and/or dynamic memory, such as random access memory (RAM), or onboard cache, for storing data and machine-readable instructions (e.g., programs, scripts, etc.).

Memory/storage 204 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 204 may be external to and/or removable from network device 200. Memory/storage 204 may include, for example, a Universal Serial Bus (USB) memory stick, a dongle, a hard disk, off-line storage, a Blu-Ray® disk (BD), etc. Memory/storage 204 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 206 and output component 208 may provide input and output from/to a user to/from device 200. Input/output components 206 and 208 may include a display screen, a keyboard, a mouse, a speaker, a microphone, a camera, a DVD reader, USB lines, and/or other types of components for obtaining, from physical events or phenomena, to and/or from signals that pertain to device 200.

Network interface 210 may include a transceiver (e.g., a transmitter and a receiver) for network device 200 to communicate with other devices and/or systems. For example, via network interface 210, network device 200 may communicate over a network, such as the Internet, an intranet, a terrestrial wireless network (e.g., a WLAN, WiFi, WiMax, etc.), a satellite-based network, optical network, etc.

Network interface 210 may include an Ethernet interface to a LAN, and/or an interface/connection for connecting device 200 to other devices (e.g., a Bluetooth interface). For example, network interface 210 may include a wireless modem for modulation and demodulation.

Communication path 212 may enable components of network device 200 to communicate with one another.

Network device 200 may perform the operations described herein in response to processor 202 executing software instructions stored in a non-transient computer-readable medium, such as memory/storage 204. The software instructions may be read into memory/storage from another computer-readable medium or from another device via network interface 210. The software instructions stored in memory/storage (e.g., memory/storage 204, when executed by processor 202, may cause processor 202 to perform processes that are described herein.

Figure 3:
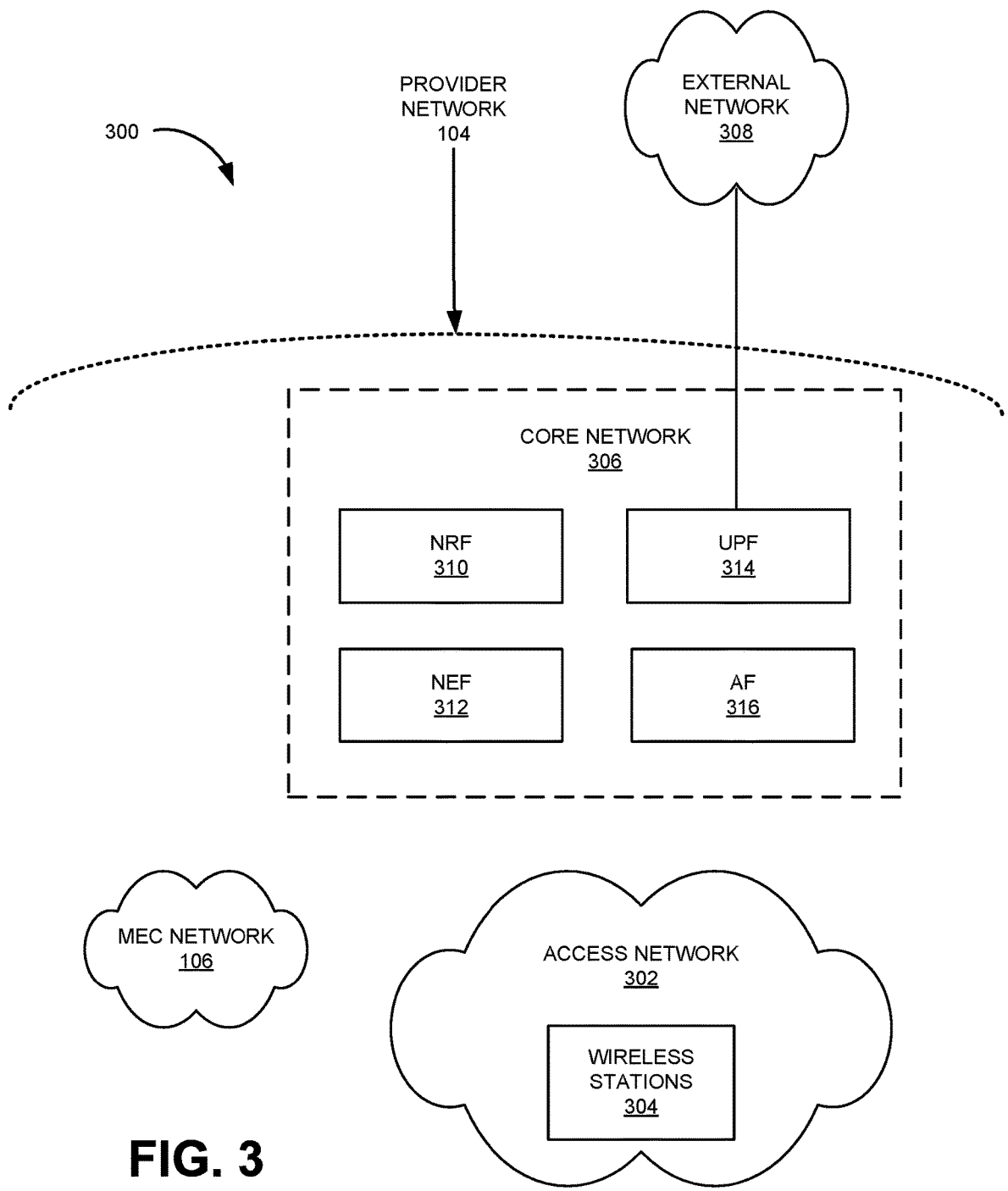
FIG. 3 illustrates a portion of the network environment of FIG. 1.

FIG. 3 illustrates a portion 300 of network environment 100 in greater detail. As shown, provider network 104 includes MEC network 106, an access network 302, and a core network 306. For simplicity, FIG. 3 does not show all of the components of provider network 104.

As indicated above, MEC network 106 includes MEC clusters. A MEC cluster is described below in greater detail with reference to FIG. 4.

Access network 302 may allow UE device 102 to access core network 306. To do so, access network 302 may establish and maintain, with participation from UE device 102, an over-the-air channel with UE device 102; and maintain backhaul channels with core network 306. Access network 302 may convey information through these channels, from UE device 102 to core network 306 and vice versa.

Access network 302 may include a Long-term Evolution (LTE) radio network and/or a 5G radio network or other advanced radio network. These radio networks may include many wireless stations, which are illustrated in FIG. 3 as wireless stations 304 for establishing and maintaining an over-the-air channel with UE device 102.

Wireless station 304 may include a Fourth Generation (4G), 5G, or another type of wireless station (e.g., eNB, gNB, etc.) that includes one or more radio frequency (RF) transceivers. Wireless station 304 (also referred to as wireless station 304) may provide or support one or more of the following: carrier aggregation functions; advanced or massive multiple-input and multiple-output (MIMO) antenna functions (e.g., 8×8 antenna functions, 16×16 antenna functions, 256×256 antenna functions, etc.); cooperative MIMO (CO-MIMO) functions; relay stations; Heterogeneous Network (HetNets) of overlapping small cell-related functions; macrocell-related functions; Machine-Type Communications (MTC)-related functions, such as 1.4 MHz wide enhanced MTC (eMTC) channel-related functions (i.e., Cat-M1), Low Power Wide Area (LPWA)-related functions such as Narrow Band (NB) Internet-of-Things (IoT) (NB-IoT) technology-related functions, and/or other types of MTC technology-related functions; Dual connectivity (DC), and other types of LTE-Advanced (LTE-A) and/or 5G-related functions. In some implementations, wireless station 204 may be part of an evolved UMTS Terrestrial Network (eUTRAN).

In some implementations, wireless stations 304 may include or be coupled to a MEC cluster. Such a MEC cluster may be geographically close to UE devices 102 that are attached to provider network 104 via wireless station 304, and thus may be capable of providing services with a minimal latency.

Core network 306 may include a local area network (LAN), a wide area network (WAN), a metropolitan area network (MAN), an optical network, a cable television network, a satellite network, a wireless network (e.g., a CDMA network, a general packet radio service (GPRS) network, an LTE core network (e.g., a 4G network), a 5G core network, an ad hoc network, a telephone network (e.g., the Public Switched Telephone Network (PSTN), an intranet, or a combination of networks. Core network 306 may allow the delivery of Internet Protocol (IP) services to UE device 102, and may interface with other external networks 308, such as a packet data network. Core network 306 may include one or more MEC clusters.

In FIG. 3, core network 306 is illustrated as including components of a 5G core network, such as a Network Repository Function (NRF) 310, a Network Exposure Function (NEF) 312, a User Plane Function (UPF) 314, and an Application Function (AF). Although core network 306 may include other 5G core network components, they are not illustrated in FIG. 3 for simplicity. For example, core network 306 may include an Access and Mobility Function (AMF), a Session Management Function (SMF), a Unified Data Management (UDM) function, a Network Slice Selection Function (NSSF), a Policy Control Function (PCF), a 5G Equipment Identity Register (EIR), a Short Message Service Function (SMSF), an Authentication Server Function (AUSF), etc. Additionally or alternatively, core network 306 may include 4G core network components or other core components of other advanced networks. Furthermore, although FIG. 3 depicts core network 306 as having a single instance of network functions (e.g., NRF, NEF, AF, etc.), in practice, core network 306 may include multiple instances of these or other network function components.

NRF 310 may support registration functions and discovery functions. NRF 310 may maintain profiles of available network function (NF) instances and their supported services. An NF profile may include an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. When a network function (NF) is instantiated, the NF may register with NRF 310, using its NF profile. Furthermore, when an NF needs to obtain information about another network function, the NF may query NRF 310 for information. In response, NRF 310 may search its database of NF profiles and return results that match the query criteria.

NEF 312 may expose capabilities and events to other NFs, including third party NFs, AFs, edge computing NFs (e.g., MEC applications), and/or other types of NFs. Furthermore, NEF 312 may secure provisioning of information from external applications to core network 306, translate information between core network 306 and devices/networks external to core network 306, support a Packet Flow Description (PFD) function, and/or perform other types of network exposure functions. NEF 312 may include a slice manager that selects a network slice for a particular UE device 102 based on a request received from a particular AF 316.

UPF 314 may maintain an anchor point for intra/inter-Radio Access Technology (RAT) mobility (e.g., mobility across different radio access technologies); maintain an external Packet Data Unit (PDU) point of interconnect to a data network (e.g., an IP network, etc.); perform packet routing and forwarding; perform the user plane part of policy rule enforcement; perform packet inspection; perform lawful intercept; perform traffic usage reporting; perform Quality-of-Service (QoS) handling in the user plane; perform uplink traffic verification; perform transport level packet marking; perform downlink packet buffering; send and forward an "end marker" to a RAN node (e.g., wireless station 304); and/or perform other types of user plane processes.

AF 316 may provide services associated with a particular application, such as, for example, application on traffic routing, accessing a Network Exposure Function, interacting with a policy framework for policy control, and/or other types of applications.

FIG. 4 shows MEC orchestrator 400 and exemplary functional components of MEC clusters 402 within MEC network 106. MEC orchestrator 400 and MEC cluster 402 may be implemented with network devices 200. MEC orchestrator 400 is described below with reference to FIG.

7. As shown, MEC cluster 402 may include a MEC host manager 404, services 406-1 through 406-L, and applications 408-1 through 408-M. Depending on the implementation, MEC cluster 402 may include additional, fewer, different, or a different arrangement of components than those illustrated in FIG. 4.

MEC host manager 404 may perform registration, discovery, and process management functions, in addition to managing communication and computational resources of MEC cluster 402. MEC host manager 404 may coordinate these functions with MEC orchestrator 400 or another MEC host manager 404. Services 406 may include threads and processes that MEC host manager 404 instantiates. Applications 408 may be started upon receipt of a request from another component external or internal to MEC cluster 402.

FIG. 5 depicts exemplary functional components of the MEC host manager 404. As shown, MEC host manager 404 may include a cluster process manager 502, a cluster interface 504, a cluster registry function 506, a discovery function 508, and a MEC database 510. Depending on the implementation, MEC host manager 404 may include additional, fewer, different or a different arrangement of components than those illustrated in FIG. 5.

Cluster process manager 502 may instantiate, terminate, and/or schedule application and service processes, depending on various constraints and parameters, such as priorities. For example, cluster process manager 502 may receive instructions from MEC orchestrator 400 to start or end certain service and/or application processes, modify their priorities, and/or schedule their execution at particular virtual/physical hardware. In another example, cluster process manager 502 may obtain process-related instructions from an administrator program (e.g., a program running on a remote device) or from stored instructions/scripts. In such a case, cluster process manager 502 may signal to a MEC orchestrator about processes that it has started, terminated or modified.

Cluster interface 504 may provide an interface through which the cluster can interact with an MEC administrator, MEC orchestrator 400, another MEC cluster (i.e., MEC host manager 404 of the cluster) or a network function to perform particular process management functions, discovery functions, and/or registry functions. For example, a service or an application in a MEC cluster 402 may subscribe to a function in provider network 104 or receive notifications from the function via cluster interface 504.

Cluster interface 504 may also route or dispatch function invocation/calls to application or service instances at different MEC clusters. For example, assume that a first application instance 408 makes a call to second application instances 408 at other MEC clusters 402. In response, cluster interface 504 consults MEC database 510 to identify MEC clusters 402 at which the second application instances 408 are hosted, creates inter-MEC messages for the call with proper addresses for each of the clusters 402 at which the call should be made, and dispatches the inter-MEC messages to the clusters 402.

When a service/application 406/408 makes a call to another service/application 406/408 at other MEC clusters 402, the calling service/application 406/408 needs to expect multiple return values from different MEC clusters 402. For example, after dispatching calls to instances of the same application at different MEC clusters 402, cluster interface 504 may collect the responses from the instances into one JSON unit, and handover the unit to the calling service/application instance 406/408. The calling service/application 406/408, therefore, must be capable of handling multi-return values. In some implementations, when a service/application instance 406/408 makes a call, the service/application instance 406/408 may be capable of specifying a particular MEC cluster 402 at which the called service/application 406/408 is hosted. In another implementation, cluster interface 504 may select a particular service/application instance 406/408 based on the location of the MEC cluster hosting the particular instance 406/408. In each of the above examples, a calling application/service instance 406/408 in the MEC cluster 402 needs to be aware of the call format in which it can make calls via cluster interface 504 as well as the formats in which it may receive return values from cluster interface 504.

Cluster registry function 506 may request MEC orchestrator 400 to register each of the services 406/408 and/or applications that cluster process manager 502 instantiates. In one implementation, cluster registry function 506 may send a profile of the instantiated service, function, or application to MEC orchestrator 400.

When cluster registry function 506 sends a registration request to MEC orchestrator 400, registry function 506 may provide a number of parameters, such as a service/application identifier, a cluster or MEC host identifier, the name of the called service/application, an argument list, and/or other information that MEC orchestrator 400 may use to advertise the service/application to other components within provider network 104 or in a MEC cluster 402. Depending on the implementation, registry function 506 may also specify a level of accessibility/visibility (e.g., private, protected, or public).

Discovery function 508 may query MEC orchestrator 400 for information regarding other MEC networks and clusters and store the results of the queries in MEC database 510. Depending on the implementation, discovery function 508 may be triggered by an incoming request for a service, by an application, or by a notification resulting from subscribing to a network function within provider network 104, etc.

MEC database 510 may include information about particular services and application instances at different MEC clusters 402 in MEC networks 106. FIG. 6 illustrates exemplary components of MEC database 510. As shown, MEC database 510 may include one or more records, one of which is illustrated as record 602. Each record in in MEC database 510 may include multiple fields. Examples of such fields are shown in FIG. 6 as a MEC network identifier field 604, a cluster identifier field 606, a type field 608, a call signature field 610, a return value field 612, and an access field 614.

MEC network identifier field 604 may include alphanumeric values or a string that identifies the network of MEC clusters 402. In some implementations, an identifier for the MEC network 106 may be assigned by MEC orchestrator 400 when an application/service 406/408 within a MEC network 106 is the first registrant of the MEC network 106. Any identifier may be used for the MEC network 106 in which the registered application/service instance 406/408 runs, provided that the identifier uniquely identifies the MEC network 106 within the MEC cloud (e.g., PLMN ID).

Cluster identifier 606 may include alphanumeric values or a string that uniquely identifies the MEC cluster 402 at which the application/service 406/408 executes. In some implementations, an identifier for the MEC cluster 402 may be assigned by MEC orchestrator 400 when an application/service 406/408 within the cluster 402 is the first registrant of the MEC cluster 402. Any identifier may be used for the MEC network 106 in which the application/service 406/408 runs, provided that the identifier uniquely identifies the MEC cluster 402 within the MEC network 106.

Type field 608 may include a value that identifies a network function (NF) type. For example, as shown in FIG. 6, for record 602, the type field 608 has "AF," which indicates the application function type.

Call signature field 610 may indicate the name of the service/application instance 406/408 and a list of argument types (e.g., integer, string, floating point, etc.). Return value field 612 may indicate the type of value that may be returned by the application/service instance 406/408 when invoked. Access field 614 may indicate whether the application/service instance 406/498 is available or visible to any component, only to components within the MEC network 106, or only to components within the MEC cluster 402.

Depending on the implementation, each record 602 in MEC database 510 may include additional, fewer, or different fields than those illustrated in FIG. 6. For example, record 602 may include a profile field and not include fields such as type field 608, call signature field 610, return value field 612, and access field 614. In another example, record 602 may include a field that indicates a geographical area, or a location associated with MEC cluster 402. Such information may be useful in selecting between two instances of the same application instances 408 at two different MEC clusters 402.

As indicated above, discovery function 508 may query MEC orchestrator 400 for information about application/service instances 406/408. When an application/service instance 406/408 within the MEC cluster 402 makes a call to another component, cluster interface 504 uses MEC database 510 to dispatch calls to proper instances in other MEC networks 106 or clusters 402.

FIG. 7 illustrates exemplary functional components of MEC orchestrator 400. MEC orchestrator 400 may run on a platform comprising one or more network devices 200. As shown, MEC orchestrator 400 may include MEC network process manager 702, an orchestrator interface 704, an orchestrator registry function 706, and a MEC database 708. Depending on the implementation, MEC orchestrator 400 may include additional, fewer, different, or a different arrangement of components than those illustrated in FIG. 7.

MEC network process manager 702 may assign applications, processes, and/or services to different MEC clusters 402. Cluster process manager 502 may instantiate, terminate, or modify processes in accordance with such instructions. In some implementations, when an administrator or an operator makes process-related changes at the MEC cluster-level, cluster process manager 502 may inform MEC network process manager 702 via cluster interface 504.

Orchestrator interface 704 may provide a mechanism for communication between MEC orchestrator 400 and MEC host manager 404 or between MEC orchestrator 400 and another MEC orchestrator 400. For example, MEC network process manager 704 may control different processes at different MEC clusters 402 via orchestrator interface 704. In another example, MEC orchestrator 400 may attempt to register with the MEC cloud, of which the MEC network 106 is a member network. Through orchestrator interface 704, MEC orchestrator 400 may perform its registry functions.

Orchestrator registry function 706 may register MEC network 106 with the MEC cloud. In one implementation, function 706 may use a central registration model, in which a global database of information about application/service instances 406/408 at different clusters 402 is situated in a database within a designated MEC network 106. In the implementation, function 706 may authenticate with the central registry (not shown) and export a publicly visible portion of its MEC database 708, to expose application and service instances 406/498 that run on its MEC clusters 402 to other MEC networks 106. When the MEC network 106 registers with the MEC cloud and exports its database 708 to the central registry, other MEC networks 106 that already have registered are notified. Each notified MEC network 106 may then import to its own MEC database 708 the updated portion of the central database.

In a different implementation, orchestrator registry function 708 may use a peer-to-peer registration model. In the model, each orchestrator registry function 708 of the participating MEC networks 106 authenticates and registers at each of other participating MEC networks 106. Each participating MEC network 106 exports its MEC database 708 to those of others. Once all the MEC networks 106 have completed their exports, the MEC database 708 would be updated.

Depending on the implementation, orchestrator registry function 706 may obtain a list of MEC networks 106 that participate in the cloud in one of many possible ways. For example, in one implementation, orchestrator registry function 706 may obtain a list of participating MEC networks 106 from an administrator. In a different implementation, assuming that core network 306 associated with the MEC network 106 is a 5G core network, the MEC network 106 may register with NRF 310 application functions for: authenticating with the cloud, registering at the cloud, and discovering cloud-related functions. In such an implementation, orchestrator registry function 706 only has to know the PLMN ID for the central registry (in the central registry model) or PLMN IDs of the participating MEC networks 106 (for the peer-to-peer model) to query the relevant NRFs 310 and access the application functions.

Depending on the implementation, MEC orchestrator 400 may rely on core network components in its provider network 104. For example, assume that core network 306 is a 5G core network. In such an implementation, orchestrator registry function 706 may register application and service instances hosted at each of its own MEC clusters 402, at NRF 310. Whether orchestrator registry function 706 registers network functions (whose information is in database 708) whose profiles are imported from other MEC networks 106 at NRF 310 may be implementation dependent.

After orchestrator registry function 706 registers with the cloud and MEC database 708 has been updated, orchestrator registry function 706 may propagate the updates to its MEC clusters 402. Depending on the implementation, orchestrator registry function 706 may apply different criteria to select or filter what portion of the updated information to provide to each MEC cluster 402 and its database 510. For example, in one implementation, orchestrator registry function 706 may simply copy all of the updates to databases 510. In a different implementation, orchestrator registry function 706 may select profiles of only those application and service instances whose MEC clusters 402 whose service area is located geographically close to the area serviced by the cluster 402 (e.g., less than X miles from each other or whose areas service areas overlap) whose database 510 is to be updated.

MEC database 708 may include information similar to those of MEC database 510. In some implementations, database 510 may include information about applications and services whose MEC networks 106 are geographically close to one another, whereas database 708 may include information about applications/services of all MEC networks 106 that are part of the MEC cloud.

As already mentioned above, systems and methods described herein may support information sharing between different MEC networks 106 that belong to the same MEC cloud. To enable such sharing, a MEC network may register and authenticate with the MEC cloud, advertising its presence to other MEC networks.

Figure 9:
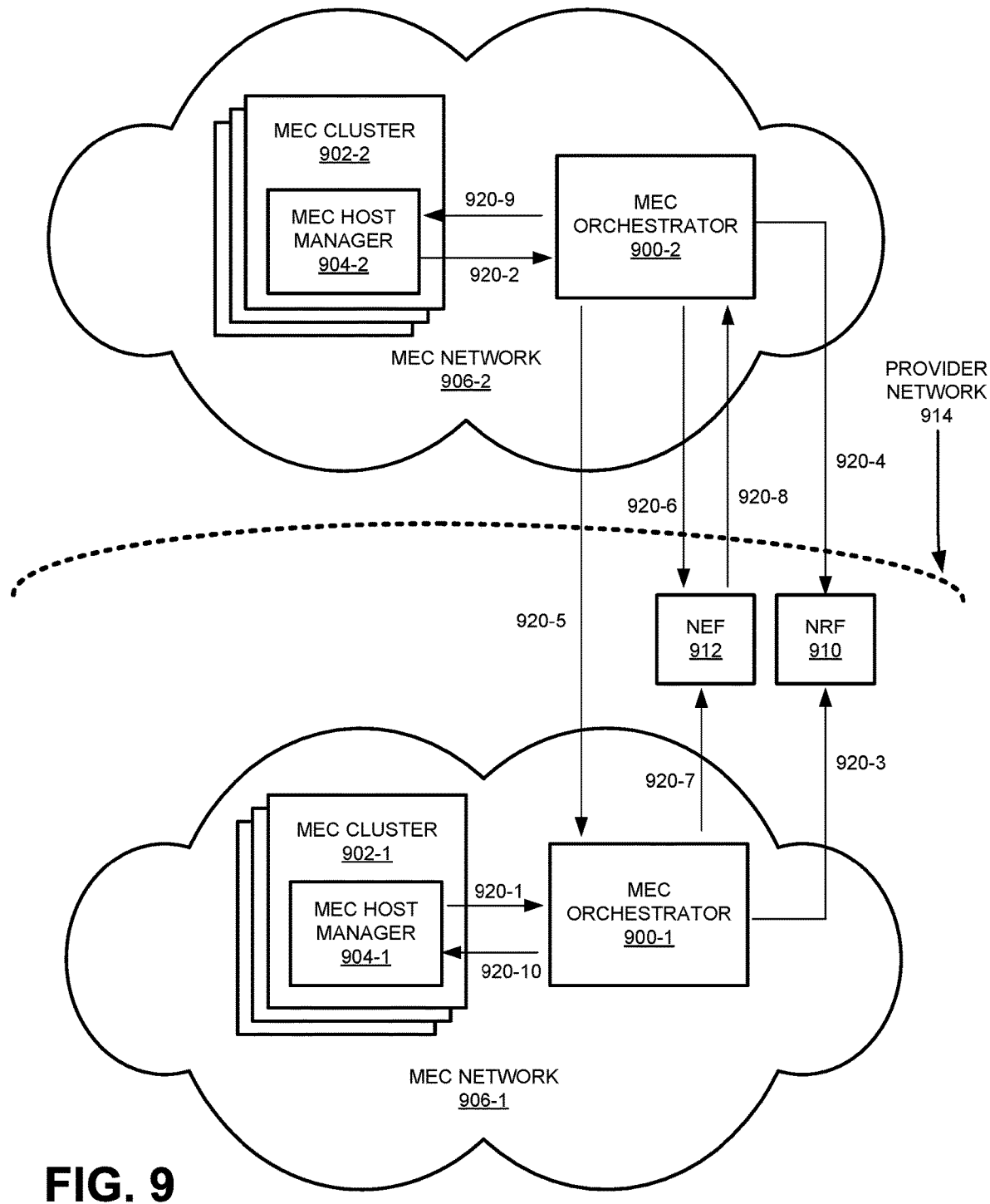
FIG. 9 illustrates exemplary communications between network components during the process of FIG. 8 according to one implementation.

FIG. 8 is a flow diagram of an exemplary process 800 associated with MEC networks 106 registering with a MEC cloud 402. Process 800 may be performed by network devices 200 that serve as the platform for executing one or more programs associated with functional components of services and applications that run on MEC cluster 402, with MEC orchestrator 400, with MEC host manager 404, and/or other functional components of provider network 104. FIG. 9 illustrates exemplary communications between network components during process 800 according to one implementation. Assume that MEC clusters 902 are interconnected via a backhaul link.

As shown, process 800 may include MEC host managers 904-1 and 904-2 registering their MEC clusters 902-1 and 902-2 with respective MEC orchestrators 900-1 and 900-2 of MEC networks 906-1 and 906-2 (block 802 and arrows 920-1 and 920-2) after MEC host mangers 904-1 and 904-2 have instantiated applications 904 at their clusters 902. The registrations 920-1 and 920-2 may include sending network function profiles for the applications 904 that run at the MEC clusters 902-1 and 902-4. MEC orchestrators 900-1 and 900-2 may respond with appropriate acknowledgement messages (not shown). In some implementations, registrations 920 may include MEC host managers 904 authenticating at MEC orchestrators 900. In other implementations, MEC clusters 902 may not register with MEC orchestrators 900.

After MEC clusters 902 in MEC networks 906 have registered with the respective MEC orchestrators 900, MEC orchestrators 900 may prepare for registration with the MEC cloud, which comprises MEC network 906-1 and 906-2. As discussed above, if the MEC cloud uses the centralized model, the central registry (also referred to as "central repository") may be included in a particular MEC network. Alternatively, if the MEC cloud uses the peer-to-peer model, each MEC orchestrator 900 may register at all other MEC orchestrators 900. In FIG. 9, the MEC cloud, comprising MEC network 906-1 and 906-2, is assumed to use the centralized model.

To render registrations of MEC network 906-1 possible at MEC orchestrator 900-1, MEC orchestrator 900-1 registers a discovery or access function at NRF 910 (block 804 and arrow 920-3). Thereafter, MEC network 906-2 uses its knowledge of provider network 914 to locate NRF 910 and query NRF 910 (arrow 920-4) and obtain the profile of the discovery function registered by MEC orchestrator 900-1 (block 806). After retrieving the profile, MEC orchestrator 906-2 invokes the discovery function at MEC orchestrator 900-1 (arrow 920-5), exchanges profiles of various applications, functions and services associated with sharing state information of its MEC clusters 902-2 and state information of MEC clusters 902-1 at MEC orchestrator 900-1 (block 808 and arrow 920-5). In addition, MEC orchestrator 900-2 subscribes to NEF 912 (block 810; arrow 920-6). When another MEC orchestrator 900 registers at MEC orchestrator 900-1, MEC orchestrator 900-1 notifies NEF 912 (arrow 920-7), which in turn notifies MEC orchestrators 900 subscribed at NEF 912 (block 812; arrow 920-8).

After MEC orchestrator 900-2 obtains profiles of applications, functions, and services associated with accessing or sharing information of MEC clusters 902-1 of MEC network 906-1, MEC orchestrator 900-2 stores the profiles at its own database, filters the profiles, and propagates the filtered profiles to its own MEC host managers 904-2 (block 814; arrow 920-9). Furthermore, after MEC orchestrator 902-2 have provided its own profiles of applications, functions and services associated with accessing or sharing information of MEC clusters 902-2 of MEC network 906-2, MEC orchestrator 900-1 filters and propagates the profiles provided by MEC orchestrator 902-2 to its own MEC host managers 904-1 (block 814; arrow 920-10). For example, MEC orchestrator 900-1 may filter profiles of applications associated with MEC clusters 902-2 that are geographically close the MEC cluster 902-1 and send the filtered profiles to MEC host manager 904-1.

Although process 800 and the communications of FIG. 9 involve only two MEC networks 906-1 and 906-2, in practice, the registration process may involve many more MEC networks that are part of the MEC cloud. Furthermore, in other implementations, the MEC cloud may employ the peer-to-peer registration model. It is also possible that the MEC cloud registration may not involve NEF 910 or NEF 912, depending on the particular network technology of the service provider (e.g., 4G network).

As mentioned above, the MEC cloud should enable the application instances at different MEC networks 104 to share state information with minimal latency. Registration of MEC networks 906 sets the stage for such sharing. Thus, after process 800, MEC networks 906 may discover neighboring or adjacent MEC clusters 902 in other MEC networks 906; and exchange information with the other MEC clusters 902 over the backhaul links or over core networks.

Figure 10A:
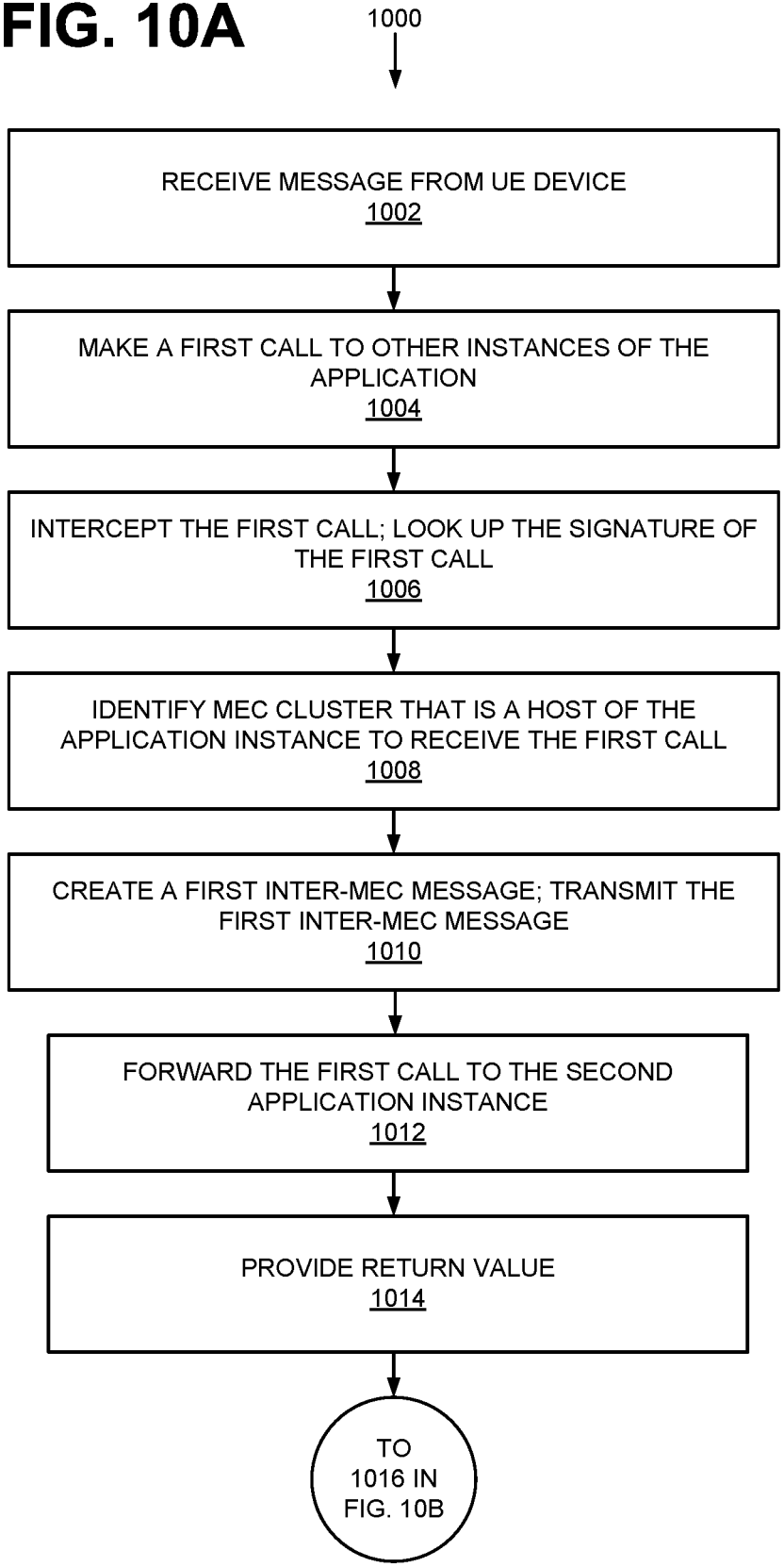
Figure 11:
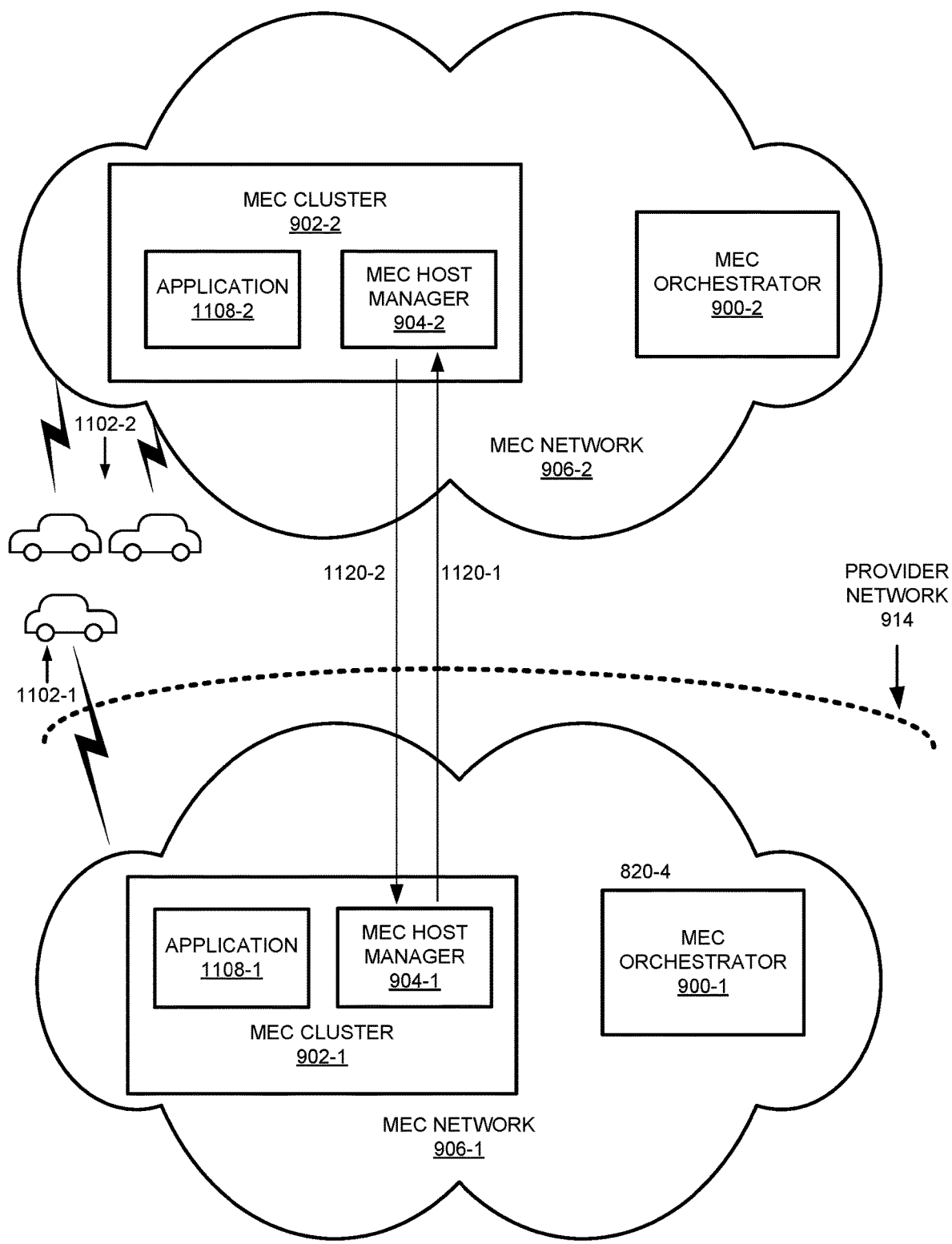
FIG. 11 illustrates exemplary communications between network components during the process of FIGS. 10A and 10B.

FIGS. 10A and 10B show a flow diagram of an exemplary process 1000 that is associated with sharing state information between MEC networks 906 that are part of the same MEC cloud. FIG. 11 illustrates exemplary communications between network components during process 1000. Process 1000 may be performed by network devices 200 that are implemented as UE devices 102 or serve as the platform for hosting services and applications that run on MEC clusters 902. For the following discussion, assume that MEC clusters 902 are connected to one another through a backhaul link.

Referring to FIGS. 10A and 11, an application instance 1108-1 at MEC cluster 902-1 may receive a message from UE device 1102-1 (block 1002). Depending on the implementation, application instance 1108-1 may receive the message over the core network of the provider network to UE device 102-1 is attached, or alternatively, over the local access network to which MEC cluster 902-1 is coupled. In FIG. 11, UE device 102-1 is depicted as an autonomous vehicle.

After the receipt of the message from UE device 102-1, application instance 1108-1 makes a first call to other instances of the same application (e.g., via a standard API that the application offers for sharing information between different instances at other MEC clusters 902) (block 1004). The format of the first call may comply with syntax rules that MEC host manager 904-1 requires or recognizes for sharing state information related to UE devices 102 or MEC cluster 902-1.

MEC host manager 904-1 intercepts the first call from application instance 1108-1 (block 1006) and performs a lookup of the signature of the first call in MEC database 510 (block 1006). In one implementation, the signature may include, for example, the name of the first call, its argument-type list, etc.

By looking up the database 510, MEC host manager 904-1 identifies MEC cluster 902-2 in MEC network 9006-2 as the host of the application instance 1108-2 ("second application instance 1108-2") that is to receive the first call (block 1008). MEC host manager 904-1 obtains the destination address of the first call (e.g., using the MEC cluster ID and MEC network ID that are stored at database 510 along with the call signature); create a first inter-MEC message that includes the destination address and the first call; and then transmits the first inter-MEC message to MEC cluster 902-2 (block 1010; arrow 1120-1) through a first gateway at MEC cluster 902-1, over the backhaul link between MEC cluster 902-1 and MEC cluster 902-2 (block 1010). MEC host manager 904 may wait for a response from MEC cluster 902-2.

At MEC cluster 902-2, a second gateway receives the first inter-MEC message over the backhaul link and relays the first inter-MEC message to MEC host manager 904-2. Upon receipt of the first inter-MEC message, MEC host manager 904-2 extracts the first call and then forwards the first call to application instance 1108-2 (block 1012) and waits for application instance 1108-2 to respond. In some implementations, MEC host manager 904-2 may use its own MEC database 510 to identify the second application instance. MEC host manager 904-2 may wait for a response from the second application instance 1108-2.

Second application instance 1106-2 responds to the first call and provides a return value to MEC host manager 904-2 (block 1014). The return value may include information that application instance 1108-1 requested. In the example of FIG. 11, assume that the return value includes a list of network addresses of UE devices 102 serviced by second application stance 1108-2 at MEC cluster 902-2.

When MEC host manager 904-2 receives the return value from second application instance 1108-2, MEC host manager 904-2 creates a second inter-MEC message that includes the return value and forwards the second inter-MEC message to MEC orchestrator 900-1 (block 1016; arrow 1120-2) through the second gateway and over the backhaul link, to MEC cluster 902-1.

At MEC cluster 902-1, the first gateway relays the second inter-MEC message received over the backhaul link to MEC host manager 904-1. MEC host manager 904-1 has been waiting for the second inter-MEC message from MEC host manager 904-2, When MEC host manager 904-1 receives the second inter-MEC message, MEC host manager 904-1 extracts the result, from the second inter-MEC message, given by second application instance 1108-2 (block 1018). MEC host manager 904-2 then provides the result to application instance 1108-1 (block 1020). Application instance 1108-1 receives the result (block 1024). In the example of FIG. 11, the result is a list of UE devices 1102-2. Application instance 1108-1 may use the list to perform an action, such as notify UE device 1102-1 about UE devices 1102-2.

In process 1000 and the example of FIG. 11, MEC cluster 902-1 dispatches the first inter-MEC message only to MEC cluster 902-2. In a different use case scenario, a call from a single MEC cluster 902 may be sent to more than one MEC cluster 902-1, if other MEC clusters 902 are running additional application instances 1108. In such a case, MEC host manager 904-1 would wait for all MEC clusters 902 to provide their return values, collect the return values, and provide them to application instance 1108-1.

In process 1000 and the example of FIG. 11, MEC clusters 902-1 and 902-2 communicate over the backhaul link. If the backhaul link were not available (i.e., the backhaul link was down or did not exist), MEC clusters 902-1 and 902-2 would communicate over their respective core networks, through appropriate gateways (e.g., corresponding UPFs).

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIGS. 8, 10A and 10B, the order of the blocks and signaling may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A network device comprising:
    one or more processors to:
        instantiate a first process in a first Multi-Access Edge Computing (MEC) cluster, which includes the network device, within a first MEC network;
        register the first MEC network at a MEC cloud that includes registration information sent from a second MEC network when the second MEC network registered at the MEC cloud, wherein when registering the first MEC network, the one or more processors are further to:
            provide a profile of the first process to a registry for the MEC cloud, wherein the profile includes at least an identifier for the first process;
            register a function for discovering the first process at a Network Repository Function (NRF) of a provider network that includes the registry for the MEC cloud; and obtain a profile of a second process, in a second MEC cluster within the second MEC network, from the registry for the MEC cloud;

receive a call from the first process;

intercept the call to obtain call information;

use the call information to look up, in the registration information, information identifying the second process in the second MEC cluster within the second MEC network;

create a first message based on the call information and the looked-up information identifying the second process;

send the first message from the first MEC cluster to the second MEC cluster;

receive, at the first MEC cluster, a second message from the second MEC cluster, wherein the second message is provided by the second MEC cluster in response to receiving the first message;

extract a return value from the second message, wherein the return value is generated by the second process in response to receipt of the call in the second MEC cluster; and relay the return value to the first process in the first MEC cluster.

2. The network device of claim 1, wherein when the one or more processors create the first message, the one or more processors are to:

identify one or more MEC clusters and MEC networks in which processes that can respond to the call are hosted, wherein the second MEC cluster is one of the identified MEC clusters and the second MEC network is one of the identified MEC networks.

3. The network device of claim 1, wherein when the one or more processors register the first MEC network at the MEC cloud, the one or more processors are to:

authenticate the first MEC network at the MEC cloud.

4. The network device of claim 1, wherein the first MEC cluster includes a local registry, and wherein when the one or more processors register, the one or more processors are to:

import, from the registry for the MEC cloud, profiles of processes hosted by the second MEC cluster, to the local registry.

5. The network device of claim 1, wherein when the one or more processors send the first message, the first message is conveyed from the first MEC cluster to the second MEC cluster over a backhaul link.

6. The network device of claim 1, wherein when the one or more processors send the first message, the first message is conveyed from the first MEC cluster to the second MEC cluster over a first core network which is part of a provider network that includes the first MEC cluster.

7. The network device of claim 1, wherein the first MEC cluster is located in a first geographical area and is coupled to a first wireless station servicing the first geographical area and the second MEC cluster is located in a second geographical area, wherein the first geographical area and the second geographical area overlap or are close to one another.

8. A method comprising:

instantiating a first process, by a network device included in a first Multi-Access Edge Computing (MEC) cluster within a first MEC network, in the first MEC cluster;

registering the first MEC network at a MEC cloud that includes registration information sent from a second MEC network when the second MEC network registered at the MEC cloud, wherein registering the first MEC network includes:

providing a profile of the first process to a registry for the MEC cloud, wherein the profile includes at least an identifier for the first process;

registering a function for discovering the first process at a Network Repository Function (NRF) of a provider network that includes the registry for the MEC cloud; and obtaining a profile of a second process, in a second MEC cluster within the second MEC network, from the registry for the MEC cloud;

receiving a call from the first process;

intercepting the call to obtain call information;

using the call information to look up, in the registration information, information identifying the second process in the second MEC cluster within the second MEC network;

creating a first message based on the call information and the looked-up information identifying the second process;

sending the first message from the first MEC cluster to the second MEC cluster;

receiving, at the first MEC cluster, a second message from the second MEC cluster, wherein the second message is provided by the second MEC cluster in response to receipt of the first message;

extracting a return value from the second message, wherein the return value is generated by the second process in response to receipt of the call in the second MEC cluster; and relaying the return value to the first process in the first MEC cluster.

9. The method of claim 8, wherein creating the first message includes:

identifying one or more MEC clusters and MEC networks in which processes that can respond to the call are hosted, wherein the second MEC cluster is one of the identified MEC clusters and the second MEC network is one of the identified MEC networks.

10. The method of claim 8, wherein registering includes:

authenticating the first MEC network at the MEC cloud.

11. The method of claim 8, wherein the first MEC cluster includes a local registry, and wherein registering includes:

importing, from the registry for the MEC cloud, profiles of processes hosted by the second MEC cluster, to the local registry.

12. The method of claim 8, wherein sending comprises:

transmitting the first message from the first MEC cluster to the second MEC cluster over a backhaul link.

13. Non-transitory computer-readable media comprising computer-executable instructions, when executed by one or more processors, cause the one or more processors to:

instantiate a first process in a first Multi-Access Edge Computing (MEC) cluster, which includes the one or more processors, within a first MEC network;

register the first MEC network at a MEC cloud that includes registration information sent from a second MEC network when the second MEC network registered at the MEC cloud, wherein when registering the first MEC network, the one or more processors are further to:

provide a profile of the first process to a registry for the MEC cloud, wherein the profile includes at least an identifier for the first process;

register a function for discovering the first process at a Network Repository Function (NRF) of a provider network that includes the registry for the MEC cloud; and obtain a profile of a second process, in a second MEC cluster within the second MEC network, from the registry for the MEC cloud;

receive a call from the first process;

intercept the call to obtain call information;

use the call information to look up, in the registration information, information identifying the second process in the second MEC cluster within the second MEC network;

create a first message based on the call information and the looked-up information identifying the second process;

send the first message from the first MEC cluster to the second MEC cluster;

receive, at the first MEC cluster, a second message from the second MEC cluster, wherein the second message is provided by the second MEC cluster in response to receiving the first message;

extract a return value from the second message, wherein the return value is generated by the second process in response to receipt of the call in the second MEC cluster; and relay the return value to the first process in the first MEC cluster.

14. The non-transitory computer-readable media of claim 13, wherein when the one or more processors create the first message, the one or more processors are to:

identify one or more MEC clusters and MEC networks in which processes that can respond to the call are hosted, wherein the second MEC cluster is one of the identified MEC clusters and the second MEC network is one of the identified MEC networks.

15. The non-transitory computer-readable media of claim 13, wherein when the one or more processors register the first MEC network at the MEC cloud, the one or more processors are to:

authenticate the first MEC network at the MEC cloud.

16. The non-transitory computer-readable media claim 13, wherein the first MEC cluster includes a local registry, and wherein when the one or more processors register, the one or more processors are to:

import, from the registry for the MEC cloud, profiles of processes hosted by the second MEC cluster, to the local registry.

17. The non-transitory computer-readable media of claim 13, wherein when the one or more processors send the first message, the first message is conveyed from the first MEC cluster to the second MEC cluster over a backhaul link.

18. The non-transitory computer-readable media of claim 13, wherein when the one or more processors send the first message, the first message is conveyed from the first MEC cluster to the second MEC cluster over a first core network which is part of a provider network that includes the first MEC cluster.

19. The computer-readable media of claim 13, wherein the first MEC cluster is located in a first geographical area and is coupled to a first wireless station servicing the first geographical area and the second MEC cluster is located in a second geographical area, wherein the first geographical area and the second geographical area overlap or are close to one another.

20. The method claim 8, wherein the first MEC cluster is located in a first geographical area and is coupled to a first wireless station servicing the first geographical area and the second MEC cluster is located in a second geographical area, wherein the first geographical area and the second geographical area overlap or are close to one another.

* * * * *